Feb. 11, 1930.    C. H. SCHMALZ    1,747,087
GLASS GOB CUTTER
Filed Dec. 1, 1926
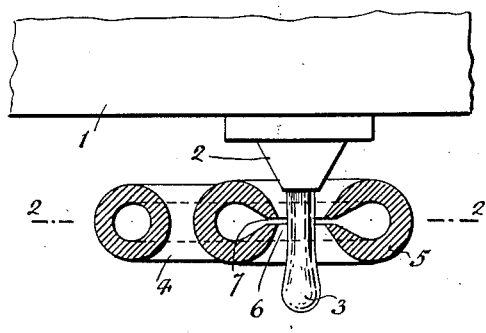
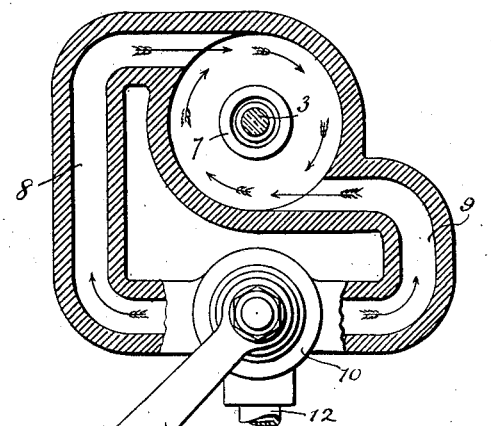
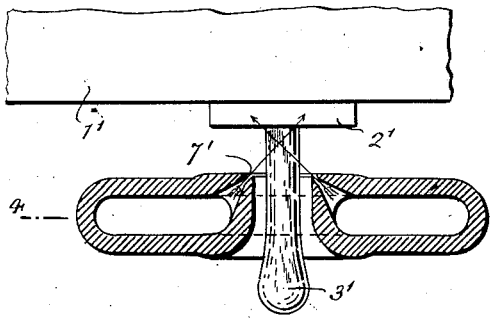
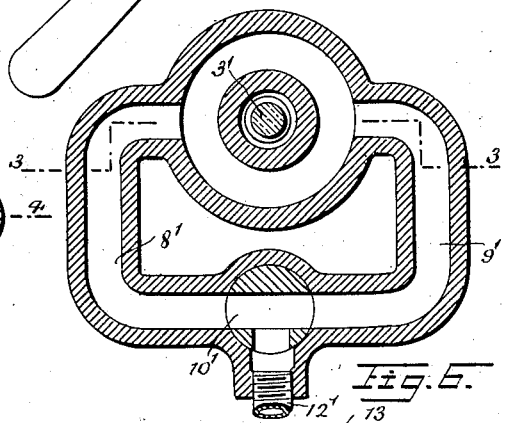
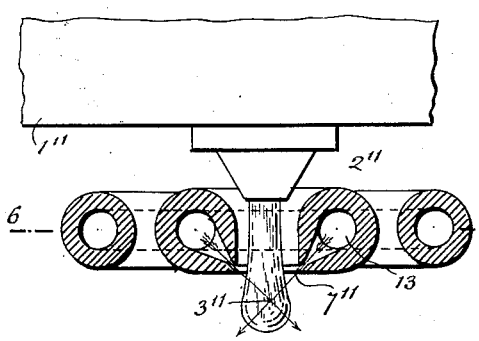
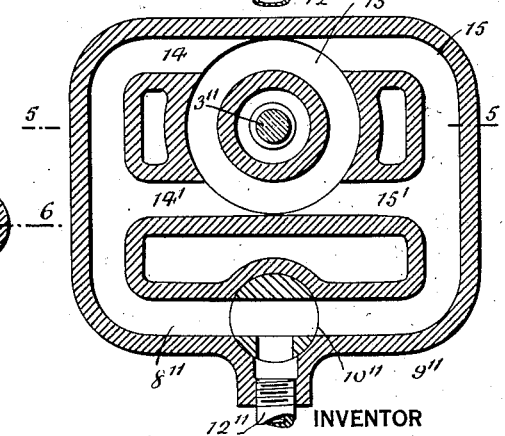
WITNESSES
H. T. Walker
A. L. Kitchin
INVENTOR
C. H. Schmalz
BY
Munn & Co.
ATTORNEY Patented Feb. 11, 1930

1,747,087

UNITED STATES PATENT OFFICE

CHARLES H. SCHMALZ, OF KENNETT SQUARE, PENNSYLVANIA

GLASS-GOB CUTTER

Application filed December 1, 1926. Serial No. 151,973.

This invention relates to a gob cutter used in the manufacture of glassware and has for an object to provide an improved construction wherein the gob may be cut by the use of a liquid or gaseous substance.

Another object of the invention is to provide an improved gob cutter using liquid or gaseous substances with the parts so arranged as to cut the gob at right angles to the flow of glass or at various angles other than a right angle.

A further object, more specifically, is to provide a gob cutter wherein air, liquid or other matter is forced through a slit or annular nozzle in substantially all directions toward the flowing glass in order to cut the glass without a visible mark.

In the accompanying drawing—

Figure 1 is a fragmentary view of a furnace or melting tank for glass with a discharge nozzle and a gob cutting device embodying the invention shown in connection therewith, the gob cutting device being shown in section.

Figure 2 is a horizontal sectional view through Figure 1 on line 2—2.

Figure 3 is a view similar to Figure 1 but showing a modified form of the invention wherein the liquid or gaseous matter is directed upwardly in the shape of a cone, the same being also a section through Figure 4 on line 3—3.

Figure 4 is a sectional view through Figure 3 on line 4—4.

Figure 5 is a view similar to Figure 3 but disclosing another form of the invention, the cutting device being shown as taken on section 5—5 of Figure 6.

Figure 6 is a sectional view through Figure 5 on line 6—6.

In the manufacture of glassware, it has been customary to permit the glass to flow from a melting tank and to cut the same off into lengths as the glass flows, said lengths being known as gobs. These gobs are cut as near the same size as possible so that the ware being manufactured will be of the same size. The present method is to use mechanical shears or some mechanical cutting device which is timed to cut the gobs of the proper size. After a gob has been cut, it drops into the mold and is acted on in the usual manner to produce the finished article. In the present invention, instead of using shears or some direct implement, a liquid or some form of gas is used to perform the cutting operation. This liquid or gas may be heated to any desired temperature or may be cool compared to the heat of glass.

Referring to the accompanying drawing by numerals, 1 indicates a tank of any desired kind which acts as a melting tank, said tank being provided with any desired form of discharge nozzle 2. If left unmolested, the nozzle 2 would discharge a continuous stream of glass 3. However, the cutting device 4 is arranged adjacent the nozzle 2 and is adapted to cut the glass 3 into gobs of a desired size. The device 4 consists of a tubular member 5 having an opening or hole 6 extending entirely therethrough and an annular slit 7 for directing anything in the tubular member 5 radially in a horizontal direction against the glass 3. The tubular member 5 merges into supply pipes 8 and 9 which are connected together by a valve 10 which may be operated manually by handle 11 or may be connected with the glass making machine or may be timed mechanically, electrically, or otherwise, independently from the glass making machine but synchronizing with the glass making machine and properly timed whereby the valve would be intermittently opened at properly spaced intervals for causing the liquid or gaseous matter flowing through the pipes 8 and 9 to be discharged through slit 7 for cutting the glass 3. A supply pipe 12 from any suitable source is provided which supplies the liquid or gas to valve 10 and from thence to the tubular member 5. It is, of course, understood, that the liquid or gaseous matter supplied through pipe 12 will be at considerable pressure so that there will be ample pressure and velocity at the slit of nozzle opening 7 to cause the glass to be quickly and in fact, almost instantly cut. As soon as one gob has been cut off it will instantly drop into a mold or other receiving device and then the liquid or gaseous matter is turned off so as to allow the glass to flow downwardly until a second gob is cut off. This action is continued as long as the device is in use. In Figure 1, a device has been shown constructed to direct the liquid or gaseous matter against the glass 3 at right angles to the axis of the glass.

It will be seen that by means of the three-way valve, the gaseous matter can be caused to flow through both of the inlet pipes 8 and 9, or only through one of the pipes, and that the gaseous matter can be shut off. Ordinarily the valve will occupy the position shown in Figure 2, and the gaseous matter will pass through both inlet pipes so that an even pressure or blast will be exerted against the stream of glass. There are times, however, when it is desirable and advantageous to admit the gaseous matter through only one inlet pipe, viz: when the temperature around or adjacent the stream of glass is not uniform. If a window is open or a draft of air from any source passes the stream of glass, it will become more chilled on one side than the other, and, therefore, harder to cut. When this occurs by shifting the valve, the gaseous matter can be caused to pass through one inlet pipe, so that the presure or blast of air will be more on one side than the other, normally on the side that is chilled the most.

In Figure 3, a modified construction is shown wherein the liquid or gaseous matter is directed at a different angle and in fact, at such an angle as to form a cone which will cut the glass 3' off near the discharge nozzle 2'.

In Figure 2, which shows the preferred form of the invention, the liquid or gaseous matter is given a whirling motion as it passes out the nozzle 7. This may be done in the modified form shown in Figures 3 and 4, though ordinarily, it will pass directly out of the slit 7' in a cone-shaped formation. If the liquid or gaseous matter is allowed to be discharged for any considerable time, the pressure thereof will hold the glass against any further outward movement and where the pressure is high it will cause the glass to move back into the melting tank 1'. Aside from the angle at which the fluid is discharged and the arrangement of the pipes 8' and 9', the structure is the same as in the preferred form.

In Figures 5 and 6, another modified form is shown wherein the discharge nozzle or slit 7" projects at an angle downwardly instead of upwardly as in Figure 3. This will cut the gob off at a greater distance from nozzle 2" than either of the other forms. It will be understood, of course, that the slot or nozzle opening 7" is annular and discharges from a substantially annular passage-way 13. In this form of the invention, the pipes 8" and 9" discharge into auxiliary passageways or pipes 14, 14' 15 and 15' and said auxiliary pipes or passage-ways will discharge into the passage-way 13. Aside from the differences pointed out, the operation and also the structure is the same as in the preferred form. It will be noted that in all forms of the invention, liquid or gaseous matter is used as a severing medium and in the appended claim it will be understood that the term gas or gaseous matter will include not only gaseous substance but liquid or anything which will function in the manner described. It will also be evident that the parts may be made of any size and that the opening for the discharge of the gas may be any width. The nozzles have been shown circular but may be V-shaped or other shape and the parts forming the nozzle or opening 7 may be made of one piece as shown or in sections, provided a sheet of gaseous material is adapted to impinge against the column of molten glass for severing the same, the gas being preferably directed in several directions toward the glass, though if desired, it could be directed from one point.

What I claim is:

A gob cutter for glass machines adapted to be positioned near the outflow of glass from a melting tank, said cutter including a hollow annular body formed with an annular discharge slit positioned to discharge toward a central point, said body being positioned so that the glass passing from said melting tank will flow axially through the center of said annular body, a pair of inlet pipes connected to said body on diametrically opposite sides and positioned to discharge gaseous matter into said hollow body at a tangent, said pipes being connected together, a supply pipe connected to said pipes at their point of juncture, and a three-way valve positioned at said point of juncture for causing gaseous matter to flow through either of said pipes independently, both pipes simultaneously and shut off the supply of gaseous matter according to the position of the valve key.

CHARLES H. SCHMALZ.